INVENTORS:
FREDERICK M. FOWKES
FRANK W. ANDERSON, JR
BY Robert C. Clement
THEIR ATTORNEY

United States Patent Office 3,394,064
Patented July 23, 1968

3,394,064
**SEPARATION PROCESS USING
A GALVANIC COUPLE**
Frederick M. Fowkes and Frank W. Anderson, Jr., Williamstown, Mass., assignors to Shell Oil Company, New York, N.Y., a corporation of Delaware
Continuation-in-part of application Ser. No. 210,947, July 19, 1962. This application Sept. 11, 1964, Ser. No. 397,066
12 Claims. (Cl. 204—150)

ABSTRACT OF THE DISCLOSURE

Suspensions (emulsions, foams, etc.) are coalesced into separate phases by contacting the suspension with a bed of solid particles comprising a mixture of at least two different substances having a difference between the electron withdrawing or donating powers of at least one volt.

---

Figure 1:
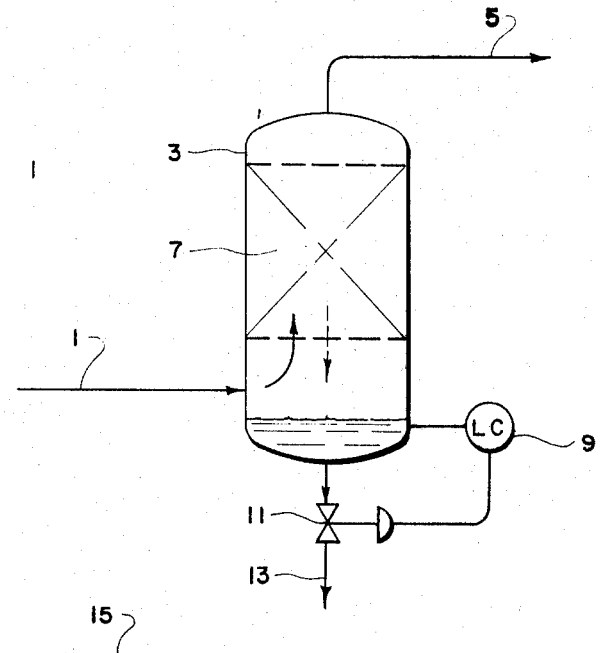

This application is a continuation-in-part of the subject matter contained in patent application No. 210,947, filed July 19, 1962 and now abandoned.

This invention relates to a process for coalescing suspensions, emulsions, or foams. More particularly, this process relates to the resolution of suspensions, emulsions, or foams by contacting them with a mixture of two different materials in the form of solid particles.

An increasing area of importance in today's industrial complex is that of finding some economical way of disposing of the unwanted by-products or wastes which result from the chemical synthesis or physical separation of many commercial products, particularly those produced in the petroleum industry.

In oil refineries, chemical plants, and transportation systems there are needs for faster and more economical methods for coalescing dilute suspensions or emulsions. Increasingly severe pollution control standards are beginning to dictate expenditures in the millions of dollars to eliminate suspended oil or chemicals from waste water. The suspended water in jet fuels is of major concern; accidental traces of surface-active material in jet fuel inactivate the normal filter-coalescers so that suspended water is carried all the way to the air field where it provides a potential hazard to aircraft. Suspended water is also a problem in other fuels, oil products, and chemicals. The removal of catalysts from polymer solutions in the production of stereospecific rubbers or adhesives often involve some difficulty of removing finely divided droplets of wash solution. Moreover, the resolution of emulsions, suspensions, and dispersions has been the subject of much investigation and research. For example, French Patent 956,149 employs a metal, e.g., aluminum, iron, or copper, with or without an adsorbent substance, e.g., activated charcoal, decolorizing earths, etc., at elevated temperatures, i.e., 80° to 100° C., to break emulsions of substances in water.

In the past, electrolytic principles have frequently been employed to break suspensions. Most electrolytic means of breaking suspension in the past have been based on the fact that coalescence of one phase may follow the passage of an externally induced electric current through the suspension (i.e., induced from without the suspension), usually in the form of a high potential alternating current; and such systems and variations thereof have been the source of several patents in this field.

Moreover, it is known in breaking water-oil emulsions to disperse finely divided metal particles in the suspension by agitation during passage of an extraneously produced electric current. For such a method, note U.S. Patent No. 1,827,714, issued Oct. 13, 1931, to Jacque C. Morrell. Therein, it is taught that metal, being a good conductor of electricity and being dispersed throughout the oil, substantially reduces the layer of oil through which the current may pass, thus facilitating the passage of the electric current generated by spaced electrodes on which a relatively high electrical potential difference is impressed.

Another improvement in electrical dehydration of oils is to use insoluble solid granules having water-wettable surfaces during the electrical treatment for the contacting of the minute particles comprising the dispersed substance, and to coalesce them into films coating the granules, and by reason of the heavier weight of the granules to carry the water films out of the electric field. This method is set forth in U.S.P. 2,030,198 by Marcel E. Cerf, issued Feb. 11, 1936. Another scheme is (set out in U.S.P. 2,045,465, issued June 23, 1936, to G. L. Hassler) to add a large concentration of granules to a dilute emulsion upon which a strong electric charge is induced to serve as nuclei for the condensation of water from the emulsion and whereby their charge and lively agitation causes them to continually shake off drops of agglometrated water before they reach excessive (i.e., wherein chaining occurs) size.

Although devices and modifications such as the above, have served some purposes, they have not proved entirely satisfactory under all conditions of service for the reasons that considerable expense is involved in the equipment used, and apparatus of this type has an inherent lack of flexibility. That is, the apparatus or unit employed has certain physical limitations which limit the flow rate, type of suspension or stream which may be treated, etc.

Now, in accordance with the instant invention, it has been discovered that it is possible to spontaneously coalesce colloidal dispersions of solids in a gas, solids in a liquid, liquids in a gas, liquids in a liquid, i.e., sols, emulsions, suspensions, or entrained gases (all of which are hereinafter referred to as "suspensions") by contacting the suspension with a bed of solid particles comprising a mixture of at least two different substances, which, under the environmental conditions present, produce a relative potential difference (electron withdrawing or donating power) of at least one volt. This "spontaneous" (i.e., without the employment of an external electromotive force source) coalescence may be accomplished by "contacting," i.e., either (1) by passing the suspension or emulsion to be coalesced through the bed particles or (2) by passing the bed particles through the suspension or (3) by combinations of both (1) and (2). Thus, by using this process a new, flexible and inexpensive electrolytic tool for the breaking and agglomerating of suspensions in process and/or waste streams has been found which applies an internal electrical driving force rather than a cumbersome difficultly controllable and expensive electrical force.

Other features and advantages of the instant invention will become apparent from the following description and the annexed drawing, which consists of two figures each of which illustrates a preferred embodiment.

FIGURE 1 of the drawing shows an embodiment of the instant invention employing a conventional upflow coalescer arrangement. The cloudy suspension to be treated comprising (as in one case) a small amount of water dispersed in kerosene, is introduced through line 1 into the column 3. The liquid introduced flows upward contacting and passing through the bed 7 composed of mixed particles having different electron donating capacities (for example, a mixture of particles of aluminum and carbon). The droplets containing substantially only water coalesce on the bed particles and are thereby removed from the upflowing feed. The latter is removed as a clear hydrocarbon phase from line 5. The coalesced water droplets pass downwardly through the bed and into the settling zone in the bottom of the column 3. The water may then be removed through line 13 by means of a conventional liquid level controller 9 and valve 11.

Figure 2:
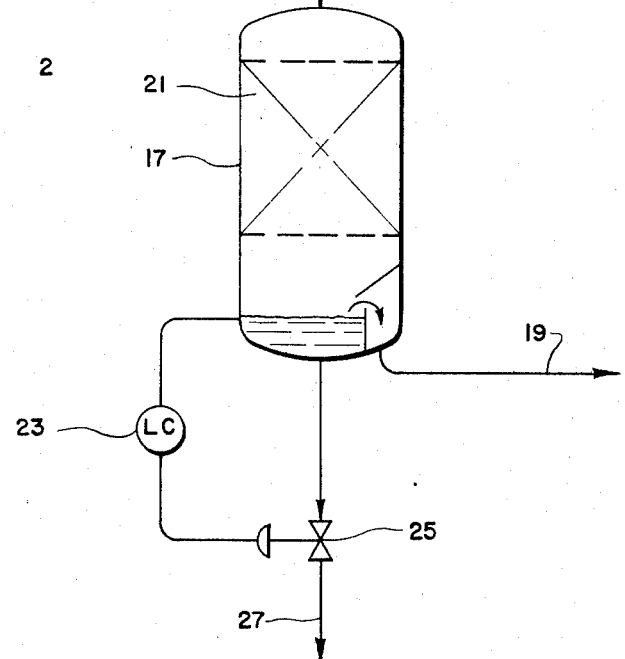

FIGURE 2 illustrates a downward flow variation of the inventive process. In this embodiment a cloudy water-in-kerosene suspension is introduced to the column 17 and into the bed of particles contained therein 21, by means of line 15. There the suspension passes downwardly through the bed with the water coalescing into droplets. The droplets of water and kerosene then flow downwardly to the bottom of the column to a settling zone from which the water is removed as a separate phase through line 27 by means of valve 25 and liquid level controller 23 and the clear kerosene is recovered from line 19.

While the process of the invention is, of course, not in any way limited by any particular theory, it is believed that the actual difference in standard oxidation-reduction potentials (electron donating or withdrawing power) between the different kinds of solid particles in the mixture of the bed is primarily responsible for a positive charge which develops on the surface of one substance of the bed and a negative charge which develops on the surface of the other substance in the bed, so that an electric field is established in the spaces between them. By this is meant, at least theoretically, that a galvanic couple is formed between the different kinds of solid particles, wherein the substance having the highest standard oxidation-reduction potential (as disclosed by the Electromotive Force Series of Elements, such as found on p. 1521, The Handbook of Chemistry and Physics, 32nd edition) assumes the role of a sacrificial anode material.

The reactions resulting from, e.g., a mixture of iron and carbon particles in an aqueous solution, are defined theoretically by a number of relatively simple reaction equations. For example, the half-reaction standard oxidation-reduction potential, wherein iron is the anode material, is measured by the following reaction occurring at the anode:

$$Fe \rightarrow Fe^{++} + 2e^- \qquad (1)$$

The normal reaction occurring in the vicinity of substances in contact with the anodic material, but having a lower standard oxidation-reduction potential than the anode materials, is the cathode reaction and is represented by the following equation:

$$2H^+ + 2e^- \rightarrow H_2 \qquad (2)$$

When the two half-reactions represented by Equations 1 and 2 occur, there is evolution of a small amount of hydrogen from aqueous phase, the formation of ferrous hydroxide and the slow constant dissolution of the iron particles. While the two half-reactions illustrated above are occurring, the charged colloidal particles are being attracted to the vicinity of the oppositely charged electrode materials wherein upon contact, the charge upon these colloidal particles is released, thereby breaking the emulsion. Under these circumstances, the driving force (relative electrode potential) is dependent upon the difference between the standard oxidation-reduction potential of the material of which the anode is composed, as determined by reference to the Electromotive Force Series of Elements and the standard oxidation-reduction potential of a normal hydrogen electrode, as represented by Equation 2, which represents the reaction occurring at the cathode. The material at which the cathodic reaction occurs is of little consequence as it only serves the purpose of carrying electrons from, e.g., the ferrous ions being released from the iron anode to the hydrogen ions in the solution.

The half-reaction potential at the cathode is primarily dependent on the reaction occurring at the cathode which will vary in response to a number of other factors among which are (1) the pH of the solution and (2) the presence of oxygen (even in trace amounts) in the solution; the solution in this case being the aqueous phase of the emulsion. In the instant invention, it is preferred that the aqueous phase be at least neutral and preferably acidic. It has been found that the relative electrode potential of a galvanic couple produced between two solid materials of the instant invention must be at least about one volt in order for an appreciable amount of colloidal phase separation to occur.

When oxygen is present in the aqueous phase of the material being treated, as it inherently is when the aqueous phase has not been treated to remove such oxygen, the driving force, i.e., the relative electrode potential, is dependent on the standard oxidation-reduction potential of the anode material and in addition is dependent upon the actual reaction occurring at the cathode, usually irrespective of what the cathode material may be. For example, when the aqueous phase is acidic or, for that matter neutral, the reaction at the cathode is represented by the following equation:

$$O_2 + 4H^+ + 4e^- \rightarrow 2H_2O \qquad (3)$$

When the aqueous phase is acidic, the reaction illustrated by (3) contributes a standard oxidation-reduction potential of $-1.23$ volts. When the aqueous phase is a neutral solution (in terms of pH), the reaction illustrated by (3) initially contributes a standard oxidation-reduction potential of $-0.82$ volt. These potential measurements, when combined with the standard oxidation-reduction potential of the sacrificial anode material, eg., iron ($+0.44$ volt), would initially result in relative electrode potentials of 1.67 and 1.26 volts, respectively.

If the emulsion contains a basic aqueous phase, the following equation is thought to represent the reaction occurring at the cathode:

$$O_2 + 2H_2O + 4e^- \rightarrow 4OH^- \qquad (4)$$

The reaction illustrated by (4) would contribute a standard oxidation-reduction potential of $-0.40$ volt which, when combined with the aforementioned oxidation reduction potential of the sacrificial anode material such as iron, would produce a relative electrode potential of about 0.84 volt.

Generally speaking, oxidizing agents in addition to oxygen, and for that matter, any electron accepting material (having a relative affinity for electrons) in solution or in the cathode, e.g., sulfur, chlorine, etc., will have a similar effect on the reaction occurring at the cathode.

Although at least about one volt of galvanic potential difference is necessary to produce appreciable neutralization of the colloidal suspension, galvanic couples with a little less than one volt of relative electrode potential could also be advantageous under certain conditions of ratio of particle volume, particle size, retention time in the contact bed and pH of the aqueous phase.

As can be seen by the above equation and discussion, the cathodic half-reaction potential, i.e., driving force of the galvanic couple produced by the presence of oxygen, is primarily dependent on the pH of the aqueous phase. The composition and solution potential of the cathode material is of little consequence, and in fact, any inert conductive material could be used. Carbon is especially advantageous because of its inert properties and low cost. However, materials such as e.g., copper, would be similarly effective.

When the particles of suspension flow through the bed, they move under the influence of the field to the surfaces of opposite charge to their own. The field strength can be considerable, e.g., 230 volts/inch with aluminum and carbon, at a potential difference of about 2–3 volts and an 0.1 mm. spacing. For this field the electrophoretic velocity is about .023 mm./sec., so that the time for particles to traverse the 0.1 mm. path on the field would be only some 4 seconds, and a bed of moderate size is accordingly effective to resolve suspension.

All materials or substances which have a difference in electron donating or withdrawing power are suitable to use as the "two different" materials forming the bed in the instant invention. Particularly desirable are mixtures of metals and/or metal alloys and/or oxides, e.g., iron-aluminum, chrome-aluminum, copper-zinc, tin-iron, copper-aluminum, and the like, mixtures of metals or metal alloys or metal oxides with non-metals, e.g., carbon-iron, carbon-aluminum, and the like; and mixtures of non-metals, e.g., carbon iodine, phosphorus, carbon, nylon with polypropylene, glass with polyethylene, wool with Teflon, and the like.

Examples of those metals which are suitable for use in the instant invention are: Li, K, Ca, Ma, Mg, Al, Zn, Cr, Fe, Cd, Ni, Sn, Pb, Cu, Hg, Ag, Cr, and Mn. Particularly desirable combinations of substances are those which have a sufficient difference in electron donating or withdrawing capacity in the aqueous phase environment, such that the relative electrode potential (i.e., the algebraic difference in electrode potentials of the half-reactions occurring at the anode and cathode materials) exceeds about 1 volt. The electrode potential of many of the suitable materials may be determined by reference to the Electromotive Force Series of Elements, supra.

When the materials used are non-metals not set forth in the Electromotive Force Series, one may employ any two different substances (such as synthetic or natural fibers) selected from the triboelectric series (reported in the June 26, 1961, issue of Chemical Engineering, p. 108–110). Particularly, such solid fibers as wool; glass; synthetic polyamides of the nylon family, i.e., copolymers of polyalkylene diamines and dibasic carboxylic acids, such as condensation polymers of hexamethylene diamine and adipic acid, or sebacic acid and the like; polyamides derived from caprolactam, etc.; polyamides derived from omegaaminoundecanoic acid, and the like, and other commerically available synthetic naturally occurring polymers; fluorinated polymers such as polytetrafluoroethylene, polychlorotrifluoroethylene, polydifluoroethylene, polychlorodifluoroethylene, etc.; cotton; polypropylene; polyethylene; and the like may be used. When the non-metals employed are polymers, it is preferred that they be of a molecular weight sufficient for their being solids, i.e., their molecular weight may range from as low as a few thousand (e.g., 7,000) up to about $10^6$.

As previously mentioned, the suspension which may be treated by the employment of the instant invention includes colloidal suspensions, water and oil (hydrocarbon or non-hydrocarbon) emulsions, entrained gases, etc. In general, any system wherein electrically charged particles, droplets or gas bubbles are present in liquids may be advantageously treated. Desirable for treatment are dilute aqueous petroleum refinery waste emulsions, carbon-in-oil suspensions, dilute water-in-oil emulsions or hazes such as that formed by the residual aqueous wash water used in the removal of catalyst by extraction and washing techniques from pentane solutons of ethylene-propylene rubber, smokes, mists, etc. Also, particularly preferred is the treatment of dilute emulsions (sometimes referred to as "hazes" of water in kerosene (i.e., jet fuel haze) and other water and light hydrocarbon emulsions, such as water in liquid propane. This process may additionally be employed in desalting of fluid crude oils.

The specific process variables may obviously be modified depending upon the suspension being treated and the particular substances making up the bed; but, for any given system and degree of separation required, these variables are readily determined by those of ordinary skill in the art.

The average particle size of the substances used in the bed material may generally vary between wide limits in the instant process provided that sufficient areas of contact are present between the anode and cathode materials to allow galvanic potential differences to be readily established and sustained. Furthermore, the particles have to be of sufficient size to avoid agglomeration of the particles. Advantages of the invention are obtained with conventional bed packing sizes such as from about 60 mesh up to about one inch. A particularly desired size range is from about 5 to about 40 mesh. The relative proportion of the types of substances employed similarly may vary within wide ranges with about a two-to-one and especially about a one-to-one volume ratio between anode and cathode material being most preferred; however, a volume ratio of from about 1:25 to about 25:1 may be utilized. Although the shape of the individual particles is not as important as the size, small annular spaces, are particularly advantageous.

As well as the particular particle size employed, the physical shape of the particles, fibers, or powders employed may vary largely. In addition to the use of the physically mixed separate particles of the instant invention, it is also possible to employ fused particles, i.e., particles wherein the two different materials are impregnated. This is the subject of copending application No. 272,560, filed Apr. 12, 1963, now U.S. Patent 3,268,456.

Moreover, the particles used may be produced by electrolytic deposition and then partially abraded to expose surfaces of both types of substances on each particle in accordance with the invention set forth in copending application No. 270,841, filed Apr. 5, 1963, now U.S. Patent 3,293,165 or by another means of providing a mixture of bed materials.

The apparatus employed in this process may be any conventional or convenient type known to those skilled in the art. Following the bed, any type of conventional separation device may be employed at the exit, such as valves, by-passes, controlling devices, etc., that may be necessary for the proper operation of the process may be employed; the inclusion of which will be evident to those skilled in the art.

While most of the description of the instant process above has been directed to the situation where a liquid suspension is "contacted" with the bed particles by passing the liquid through a stationary bed, it is apparent that the bed particles may be circulated through the liquid by means of conventional stirring devices, shakers, etc., to achieve a similar effect; and the term "contacted" should be construed to include all of these means.

While in any given application, the bed size is a function of the residence time and the velocity of the material passing through the bed, these factors also may vary within wide values. For example, it is generally desirable to have a minimum residence time of about 0.1 second up to any residence time desired. However, a preferred range is from about 3 seconds to 60 seconds. The velocity, of course, will be fixed by the bed size and the particular residence time desired; however, the general operating velocity may vary from about 0.1 feet per minute and lower up to about 10 feet per minute and higher. The most desirable range of velocities employed are from about 1 foot per minute to about 3 feet per minute.

The invention is further illustrated, but not limited by the following specific examples of the inventive process.

EXAMPLE I

A dilute water-in-kerosene emulsion was produced by steaming a kerosene containing about 50 parts of sodium dodecylbenzene sulfonate per million parts kerosene by weight until a stable water haze having a concentration of about 1000 parts of suspended water per million parts of emulsion by weight was obtained. The emulsion so formed had a turbidimeter reading of 27% transmission of incident light. The emulsion was then passed through a mixture comprising approximately equal volumes of 40 mesh iron mixed with coconut charcoal of 20–30 mesh contained in a cylindrical column (approximately 2 centimeters in diameter by 2 centimeters deep) at a flow rate of about 250 milliliters per minute. The final effluent recovered had a turbidimeter reading of 88% transmission.

EXAMPLE II

An emulsion prepared similar to that employed in Example I was passed through a column under substantially the same conditions except that the bed was composed of substantially equal volumes of copper and carbon particles. Turbidimeter readings indicated that the percentage of transmission of the emulsion entering the column was 27% and that of the effluent 72%.

EXAMPLE III

The aqueous effluent from a refinery vacuum still condenser, containing about 300 p.p.m. of well suspended, finely divided hydrocarbon haze picked up by the stream eductors from the stock being distilled is passed through aluminum-carbon and iron-carbon beds at a flow rate of one-third bed volume per second. Both beds completely clarified the haze and the effluent treated was visually sparkling clear.

EXAMPLE IV

Jet fuel contaminated by sub-micronparticles of water which remained even after several conventional filtrations in the course of transport by pipe line from the refinery to the air field and from the pipe line by truck on the field to the planes was successfully treated by an aluminum-carbon bed of the instant invention.

EXAMPLE V

An 0.1% oil-in-water emulsion (from the barometric condenser for a refinery vacuum distillation unit) was passed through a mixed bed comprising equal volumes of 20 mesh granules of iron and 8 mesh granules of carbon at a linear velocity of 2 inches per second. The emulsion was substantially completely coalesced with the oil forming large drops which dripped out of the bed and a clear aqueous effluent was separated.

To further illustrate the unexpected nature of the instant invention, a number of experimental tests were conducted using the present process to treat emulsions prepared as set forth in Example I.. These data were obtained by treating a water-in-jet fuel emulsion (1) by means of the instant process and (2) by treating the same emulsion with a pass through two single component beds in series and (3) single passes through beds containing only one substance. The columns used in obtaining these data were packed with a mixture of approximately equal volumes of the two particular substances employed. The metals were 40 mesh or smaller. The carbon was coconut charcoal of 20–30 mesh. The columns were cylindrical (approximately 2 cm. x 2 cm.) and flow rates were about 250 ml./minute.

These data are tabulated below:

TABLE I.—EFFECT OF COLUMN PACKING

| Column Content | Percent Transmission Feed | Percent Transmission Effluent |
|---|---|---|
| Carbon (only) | 33 | 60 |
| Iron (only) | 33 | 79 |
| Iron and Carbon (Consecutively) | 33 | 86 |
| Iron, Carbon (Mixed) | 33 | 94 |

Below, in Table II, additional tests employing the process of the invention (under conditions substantially the same as those set forth in Example I above) gave the following results:

TABLE II.—TURBIDIMETRY RESULTS

| Column Packing | Percent Transmission Feed | Percent Transmission Effluent |
|---|---|---|
| Run No.: | | |
| 1 .......... Carbon-Iron | 27 | 88 |
| 2 .......... Carbon-Iron ᵃ | 47 | 78–84 |
| 3 .......... Carbon-Copper | 27 | 72 |
| 4 .......... Carbon, Copper ᵃ | 10 | 93 |
| 5 .......... Tin, Zinc | 17 | 67 |
| 6 .......... Clay | 33 | 98 |
| 7 .......... Clay ᵃ | 33 | 33 |

ᵃ Water saturated by prior soaking with water.

These data particularly point out another of the unexpected advantages of the instant invention, namely, that the presence of water in the mixed bed (for example, Runs 2 and 4) does not suffer the limitation exhibited by clay (Run 8) since the wet mixed metal beds, unlike wet clay columns, do not retain water; but rather, pass it as coalesced drops which settle rapidly. Clay beds, while effective initially, become ineffective when saturated with water. This latter aspect, i.e., that the instant invention does not substantially require regeneration and functions even after previous saturation with water, is of tremendous economic importance since it obviates the inconvenience and expense involved in the maintenance and/or regeneration involved in clay or adsorbent type treatment.

It should be understood that the foregoing disclosure relates only to a preferred embodiment of the invention and that numerous modifications or alternations may be made therein without departing from the spirit and the scope of the invention.

We claim as our invention:

1. A process for coalescing a suspension into two phases which comprises contacting the suspension with a mixture of two different solids, such solids having a 1:25 to 25:1 volume ratio and a particle size of from about 60 mesh up to about 1 inch, wherein a galvanic couple is formed, having a relative electrode potential between the anode reaction occurring at one of said different solids and the cathode reaction occurring at the other of said different solids of at least one volt, for a residence time of about 0.1 second up to about 60 seconds, to produce two substantially separate phases.

2. A process in accordance with claim 1 wherein said two substantially separate phases are subsequently recovered.

3. A process in accordance with claim 1 wherein said suspension is water in a liquid hydrocarbon.

4. A process in accordance with claim 1 wherein said different solid at which the anode reaction is occurring is aluminum.

5. A process in accordance with claim 1 wherein said different solid at which the anode reaction is occurring is iron.

6. A process in accordance with claim 1 wherein said different solid at which the anode reaction is occurring is copper.

7. A process in accordance with claim 1 wherein said other different solid at which the cathode reaction is occurring is carbon.

8. A process in accordance with claim 1 wherein said different solid at which the anode reaction is occurring is iron and said other different solid at which the cathode reaction is occurring is carbon.

9. A process in accordance with claim 1 wherein said other different solid at which the cathodic reaction is occurring is copper.

10. A process in accordance with claim 1 wherein said suspension is a colloidal suspension of solids in a liquid.

11. A process in accordance with claim 1 wherein said suspension is a petroleum refinery waste stream.

12. A process for coalescing and agglomerating a suspension of water in a liquid hydrocarbon comprising:
 (1) passing said suspension through a contacting zone comprising a 1:1 volume ratio mixture of iron and carbon particles, said particles having a particle size of from about 60 mesh up to about one inch, for a residence time of from about .1 up to about 60 seconds and
 (2) recovering the water and liquid hydrocarbon as substantially separate phases.

References Cited

UNITED STATES PATENTS

| 614,617 | 11/1898 | Milligan | 204—150 |
| 1,747,175 | 2/1930 | Mahler | 210—28 |
| 1,993,761 | 3/1935 | Tippins | 210—28 |
| 2,305,657 | 12/1942 | Aehnelt | 210—28 |

JOHN H. MACK, *Primary Examiner.*

A. C. PRESCOTT, *Assistant Examiner.*